US012175013B2

(12) United States Patent
Dimitrov et al.

(10) Patent No.: US 12,175,013 B2
(45) Date of Patent: Dec. 24, 2024

(54) SYSTEM AND METHOD FOR A BLENDED REALITY USER INTERFACE AND GESTURE CONTROL SYSTEM

(71) Applicants: Rouslan Lyubomirov Dimitrov, Santa Clara, CA (US); Allison Phuong Huynh, Palo Alto, CA (US)

(72) Inventors: Rouslan Lyubomirov Dimitrov, Santa Clara, CA (US); Allison Phuong Huynh, Palo Alto, CA (US)

( * ) Notice: Subject to any disclaimer, the term of this patent is extended or adjusted under 35 U.S.C. 154(b) by 0 days.

(21) Appl. No.: 18/337,366

(22) Filed: Jun. 19, 2023

(65) Prior Publication Data
US 2023/0333637 A1   Oct. 19, 2023

Related U.S. Application Data

(63) Continuation of application No. 17/739,689, filed on May 9, 2022, now Pat. No. 11,681,360, which is a continuation of application No. 17/316,627, filed on May 10, 2021, now Pat. No. 11,327,560, which is a continuation of application No. 16/259,991, filed on Jan. 28, 2019, now Pat. No. 11,003,241, which is a continuation of application No. 15/869,702, filed on Jan. 12, 2018, now Pat. No. 10,191,540, which is a
(Continued)

(51) Int. Cl.
*G06F 3/01* (2006.01)
*G06F 1/16* (2006.01)
*G06F 3/03* (2006.01)

(52) U.S. Cl.
CPC ............. *G06F 3/012* (2013.01); *G06F 1/163* (2013.01); *G06F 3/011* (2013.01); *G06F 3/0304* (2013.01)

(58) Field of Classification Search
CPC .......... G06F 3/012; G06F 3/011; G06F 1/163; G06F 3/0304; G06F 3/017; G06T 19/006
See application file for complete search history.

(56) References Cited

U.S. PATENT DOCUMENTS

| 9,304,585 B2 | 4/2016 | Fuji et al. |
| 9,615,177 B2 * | 4/2017 | Englert ................... H04R 5/04 |
| 9,870,064 B2 | 1/2018 | Dimitrov et al. |

(Continued)

OTHER PUBLICATIONS

Lang, "'Envelop,' Launches Open Beta of Immersive Windows Desktop Platform for Vive and Rift." Aug. 11, 2016, pp. 1-2.

*Primary Examiner* — Antonio A Caschera
(74) *Attorney, Agent, or Firm* — Haynes and Boone, LLP

(57) ABSTRACT

A blended reality user interface and gesture control system includes one or more sensors, a head-mounted display, and a blending engine. The blending engine is configured to receive a live reality and virtual reality feeds, track movement of a user using the sensors, detect a command based on the tracked movement, blend the live and virtual reality feeds into a blended view based on the detected command, and display the blended view on the head-mounted display. In some embodiments, the blending engine is further configured to detect an amount of head tilt of the user and adjust a blending factor controlling an amount of transparency of the live reality feed within the blended view based on the amount of head tilt. In some embodiments, the blending engine is further configured to detect manipulation of a controller by the user and adjust the blending factor based on the detected manipulation.

20 Claims, 4 Drawing Sheets

Related U.S. Application Data continuation of application No. 15/365,038, filed on Nov. 30, 2016, now Pat. No. 9,870,064.

(60) Provisional application No. 62/349,612, filed on Jun. 13, 2016.

(56) References Cited

U.S. PATENT DOCUMENTS

| | | |
|---|---|---|
| 10,191,540 B2 | 1/2019 | Dimitrov et al. |
| 11,003,241 B2 | 5/2021 | Dimitrov |
| 11,327,560 B2 | 5/2022 | Dimitrov |
| 2002/0044152 A1 | 4/2002 | Abbott, III et al. |
| 2015/0015460 A1 | 1/2015 | Kobayashu et al. |
| 2015/0092015 A1 | 4/2015 | Stafford |
| 2016/0104452 A1 | 4/2016 | Guan et al. |
| 2016/0314622 A1 | 10/2016 | Davis et al. |
| 2019/0371075 A1 | 12/2019 | Stafford |

\* cited by examiner

SYSTEM AND METHOD FOR A BLENDED REALITY USER INTERFACE AND GESTURE CONTROL SYSTEM

RELATED APPLICATIONS

The present application is a continuation of U.S. patent application Ser. No. 17/739,689, filed May 9, 2022, now allowed, which is a continuation of U.S. patent application Ser. No. 17/316,627, filed May 10, 2021 now U.S. Pat. No. 11,327,560 issued May 10, 2022, which is a continuation of U.S. patent application Ser. No. 16/259,991 filed Jan. 28, 2019, now U.S. Pat. No. 11,003,241 issued on May 11, 2021, which is a continuation of U.S. patent application Ser. No. 15/869,702 filed Jan. 12, 2018, now U.S. Pat. No. 10,191,540 issued Jan. 29, 2019, which is a continuation of U.S. patent application Ser. No. 15/365,038 filed Nov. 30, 2016, now U.S. Pat. No. 9,870,064 issued Jan. 16, 2018, which claims priority to U.S. Provisional Patent Application No. 62/349,612, entitled "System and Method for Blended Reality User Interface and Gesture Control System," filed Jun. 13, 2016, each of which is herein incorporated by reference in its entirety.

TECHNICAL FIELD

The present disclosure relates generally to computing systems and the presentation of virtual environments and more specifically to a blended-reality user interface and gesture control system.

BACKGROUND

The popularity of virtual reality systems is increasing. However, users of virtual reality systems, especially those using a head-mounted display, often have limited ability to interact with objects and the environment around them. Accordingly, it would be advantageous to have a blended reality user interface and gesture control system that would allow users immersed in a virtual reality environment to more easily interact with the environment around them.

SUMMARY

According to some embodiments a blended reality user interface and gesture control system includes one or more sensors, a head-mounted display, and a blending engine. The blending engine is configured to receive a live reality feed, receive a virtual reality feed, track movement of a user using the one or more sensors, detect a command based on the tracked movement, blend the live reality feed and the virtual reality feed into a blended view based on the detected command, and display the blended view on the head-mounted display.

According to some embodiments, a method includes receiving a live reality feed from one or more cameras, receiving a virtual reality feed, tracking, by a blending engine, movement of a user using one or more sensors, detecting, by the blending engine, a command based on the tracked movement, blending, by the blending engine, the live reality feed and the virtual reality feed into a blended view based on the detected command, and displaying the blended view on a head-mounted display.

According to some embodiments, a non-transitory computer-readable medium includes a plurality of machine-readable instructions which when executed by one or more processors are adapted to cause the one or more processors to perform a method. The method includes receiving a live view from one or more cameras, receiving a virtual view from a virtual reality system, tracking movement of a user using one or more sensors, detecting a command based on the tracked movement, blending the live view and the virtual view into a blended view based on the detected command, and displaying the blended view on a head-mounted display.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
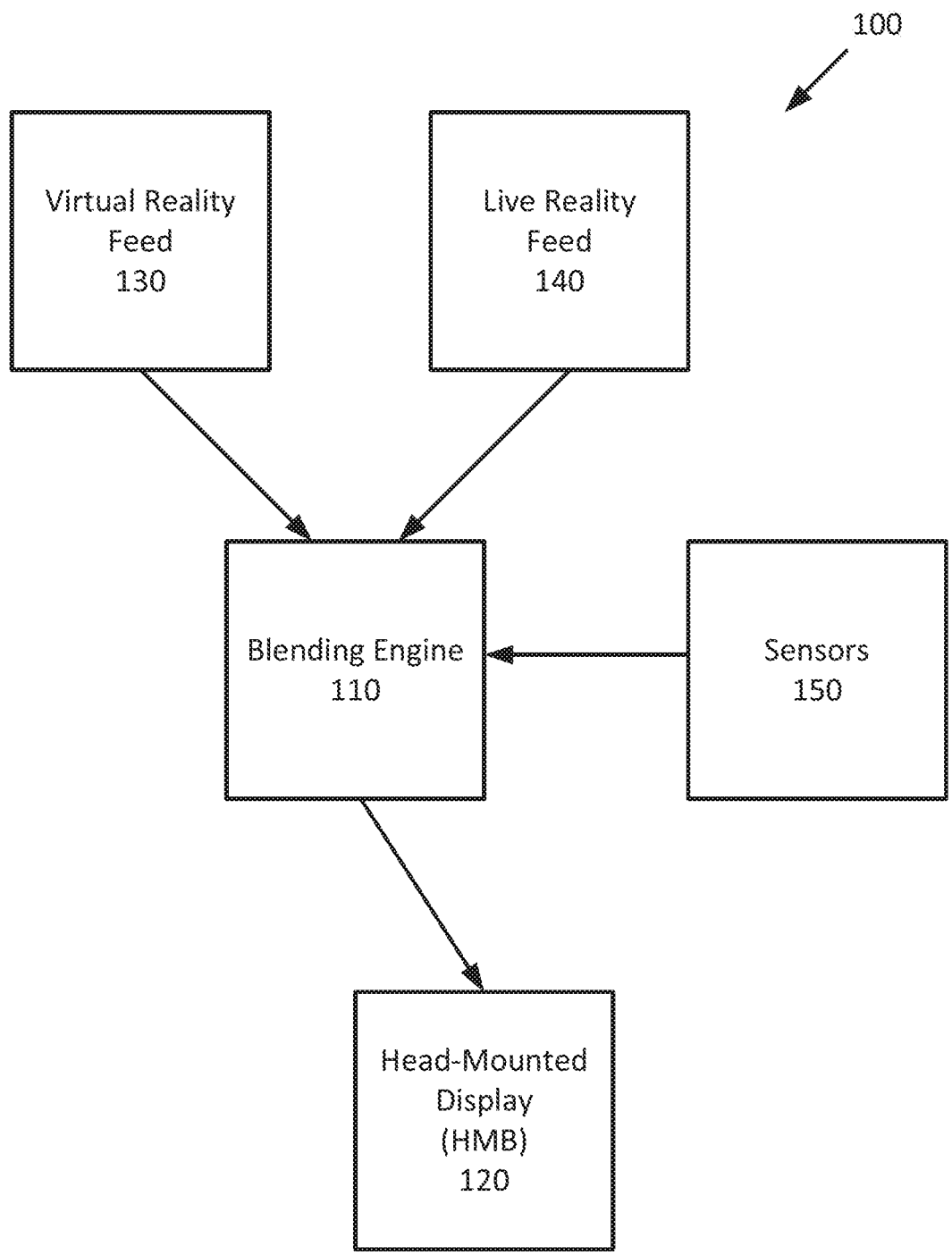
FIG. 1 is a simplified diagram of a blended reality user interface and gesture control system according to some embodiments.

FIG. 1 is a simplified diagram of a blended reality user interface and gesture control system 100 according to some embodiments. As shown in FIG. 1, the blended reality user interface and gesture control system 100 based around a blending engine 110. Blending engine 110 generates one or more virtual and/or blended views that may be displayed to a user via a head-mounted display (HMD) 120. Head-mounted display 120 may provide support for two-dimensional monoscopic and/or three-dimensional stereoscopic images to the user. The blended views displayed by head-mounted display 120 may include static and/or dynamic images provided by a virtual reality feed 130. In some embodiments, virtual reality feed 130 may be provided by a virtual reality system (not shown), game and/or entertainment software, and/or the like. The blended views displayed by head-mounted display 120 may further include static and/or dynamic images provided by a live reality feed 140. In some embodiments, live reality feed 140 may be provided by a video feed from one or more video cameras mounted to the head-mounted display 120 so as to provide a live view as would be seen by the user were the user not using the head-mounted display. In some examples, blending engine 110 uses techniques, such as alpha blending.

Figure 2:
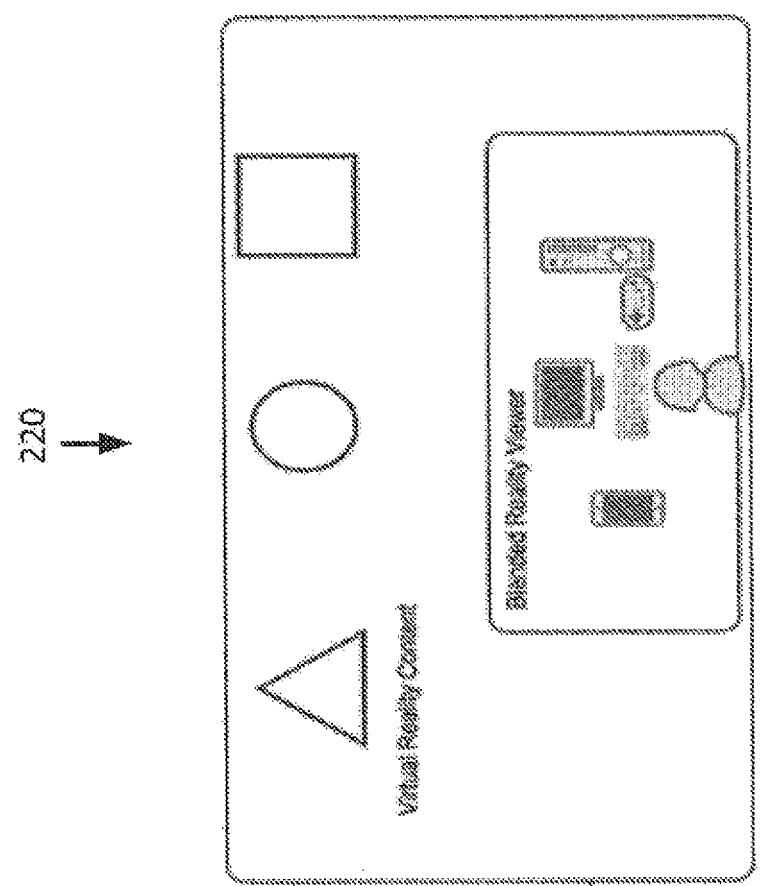
FIG. 2 is a simplified diagram of a live environment and a corresponding blended user interface according to some embodiments.
Figure 2:
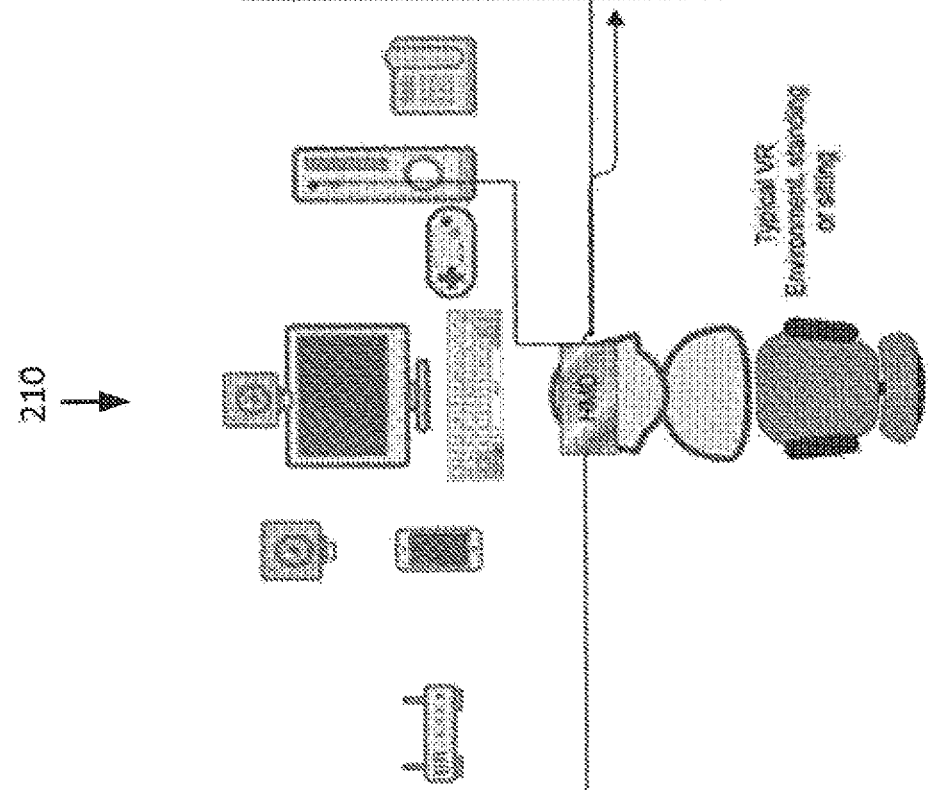

FIG. 2 is a simplified diagram of a live environment 210 and a corresponding blended user interface 220 according to some embodiments. As shown in FIG. 2, live environment 210 about a user using a head-mounted display (HMD), such as head mounted display 120, is shown to the left. As shown on the right, the blended user interface 220 as seen on the head-mounted display includes both elements from live environment 210 and a virtual reality content.

Referring back to FIG. 1, the blended reality user interface and gesture control system 100 further includes one or more sensors 150 that may be used to track movement of the user and/or head-mounted display 120. The one or more sensors 150 may include one or more accelerometers, gyroscopes, cameras, and/or the like to track motion of the user's head, arms, hand, legs, feet, and/or the like. The tracked motion may be used by blending engine 110 to change how both the virtual reality feed 130 and/or the live reality feed 140 are blended and then displayed on head-mounted display 120. Depending upon input from the one or more sensors 150, blending engine 110 may provide the virtual reality feed 130 with more prominence (fading the live reality feed 140) or may provide the live reality feed 140 with more prominence (fading the virtual reality feed 130). In some examples, an alpha blending factor may be adjusted by blending engine 110 to provide more prominence to the virtual reality feed 130 and/or the live reality feed 140.

In some embodiments, the blended reality user interface and gesture control system 100 and blending engine 110:
  Continuously records the motion of the user's body through the one or more sensors 150;
  Has the ability to display the live reality feed 140 blended inside a virtual environment of the virtual reality feed 130;
  Slowly fades the live reality feed 140 when the user looks up and slowly brings the live reality feed 140 into greater prominence when the user looks down to see hands, feet, and other periphery and allows for large and fine motor manipulation with continuous feedback for the operation of equipment such as keyboard, mouse, camera, monitor, phone, cables, chairs and any equipment in view;
  Continuously reads the motion of the user's body;
  Interprets the body gestures as one of numerous computer commands; and
  Modifies the blended reality content and/or activates new systems in response to the computer commands.

In some embodiments, whenever the user tilts their head down, the blended reality user interface and gesture control system 100 would display the user's physical hands and nearby objects blended with the virtual world. In some embodiments, whenever the user leans forward, the blended reality user interface and gesture control system 100 would amplify the leaning in, so that the user can physically have larger range of motion in the virtual space, even if physical space around him/her is limited. In some embodiments, the blended reality user interface and gesture control system 100 displays the stream of camera subsystems such as one or more webcams or onboard cameras with software that creates a unified blended reality experience to improve on virtual reality usability in terms of safety, more precise position of digital manipulation of user's hands, feet and other extremities. In some embodiments, the live video feed 140 is displayed with a projection corresponding to the camera orientation in physical space. In some embodiments, the live video feed 140 is reprojected from the user's virtual position. In some embodiments, the live video feed 140 is reprojected from the perspective of the user's eyes so that the live video feed 140 includes the same view as the user would see if the user was not using the head-mounted display. In some examples, the relative depth of the live video feed 140 may be adjusted (e.g., shifted away from the camera) to provide a more realistic depth perception when the live video feed 140 is blended with the virtual reality feed 130. In some embodiments, the live video feed 140 is blended (faded in and out) based on heuristics determining when the user's experience will be enhanced by seeing the physical surroundings. In some embodiments, the live video feed 140 is displayed in a rectangular video screen or blended with a stencil, or alpha blended based on a predefined image or function. In some embodiments, the live video feed 140 is fixed in virtual space or moving with a fixed transform to the camera, or a function based on either or both. In some embodiments, the live reality feed 140 is provided by multiple cameras to provide a virtual view of the physical world that has extended field of view or detail compared to the feed of a single camera. In some examples, a live video feed 140 from a webcam or other camera mounted in the physical world with an orientation that does not change with the user's direction of view would be blended with the virtual reality feed 130 based on whether the field of view of the user overlaps the field of view of the web camera or other camera. For example, a live video feed 140 from a camera pointed toward the user would only be blended with the virtual reality feed 130 when the back of the user's head is turned toward the camera. In some examples, movement of the webcam or other camera may be tracked so that changes in the position and/or orientation of the corresponding live video feed 140 may be adjusted before being blended with the virtual reality feed 130. In some embodiments, the virtual view exhibits stereoscopy or has depth-based occlusion. In some embodiments, the virtual view selectively displays some physical objects and discards others.

In some embodiments, the blended reality user interface and gesture control system 100 maps physical body movement of the user to gestures and commands that are interpreted by a computing device in a virtual/augmented reality context. In some embodiments, the detected and/or tracked user motion results in the output of a set of zero, one or more computer commands. In some embodiments, one of the computer commands activates a blended reality subsystem when the user looks down or seeks a physical object with their hands or other extremities. In some embodiments, one of the computer commands amplifies translational motion in virtual space compared to physical space in order to increase the virtual reach of the user. In some embodiments, the relative motion of the user's hands or controllers held in one or more hands are interpreted as computer commands. In some embodiments, motion of the user's legs, feet or other extremities are interpreted as computer commands. In some embodiments, one of the computer commands moves, rotates, scales, and/or the like one or more virtual objects based on the detected motion. In some embodiments, one or more gameplay commands are activated in response to the detected motion. In some examples, gameplay commands may be triggering an interaction with virtual objects (e.g., opening doors), signaling to another virtual player regardless of whether they are human or computer controlled and operated, controlling a computer subsystem (i.e., adjusting the sound volume), and/or the like.

Figure 3:
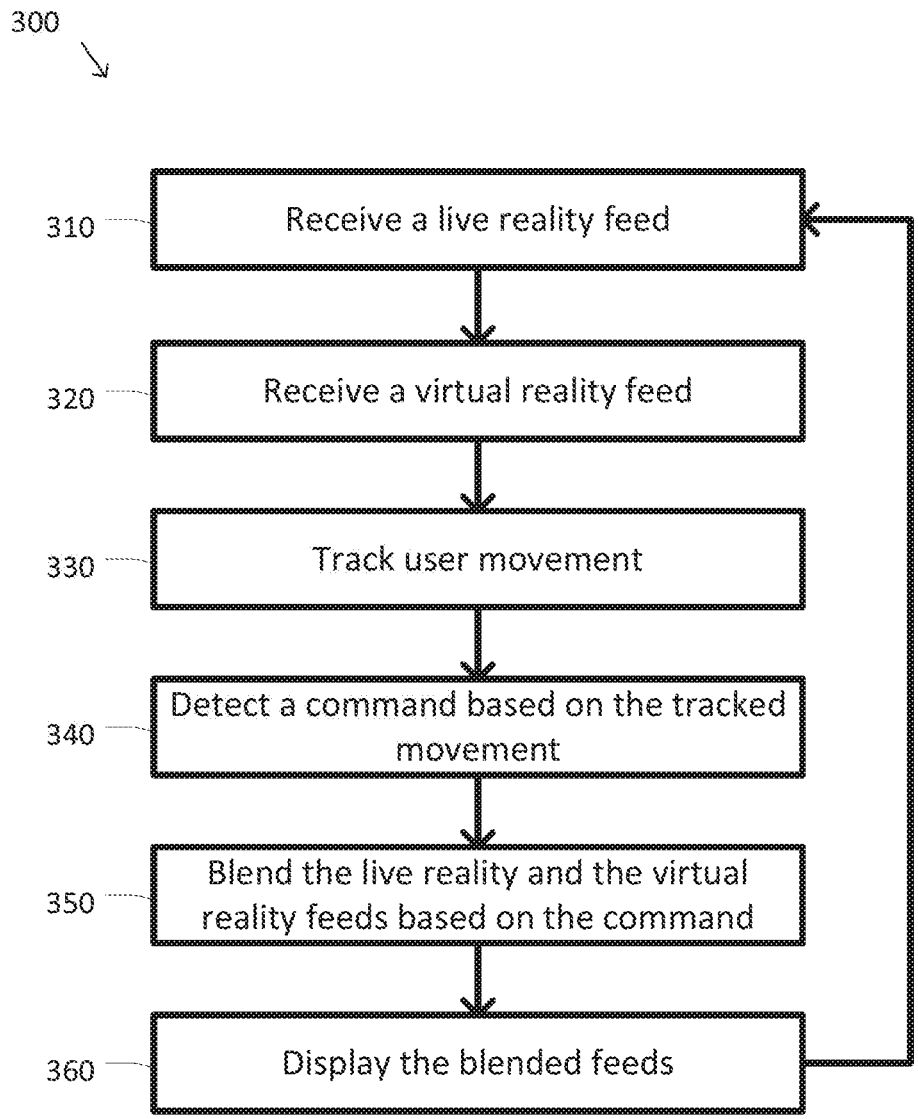
FIG. 3 is a simplified diagram of a method of displaying blended reality according to some embodiments.

FIG. 3 is a simplified diagram of a method 300 of displaying blended reality according to some embodiments. One or more of the processes 310-360 of method 300 may be implemented, at least in part, in the form of executable code stored on non-transitory, tangible, machine readable media that when run by one or more processors may cause the one or more processors to perform one or more of the processes 310-360. For example, method 300 may be performed by blending engine 110 to generate blended user interface 220 on a head-mounted display. Although the processes of method 300 are drawn in an apparent order, one of ordinary skill would understand that processes 310-360 may be performed in other orders and/or one or more of the processes may be performed concurrently. In some embodiments, method 300 may include additional processes that are not shown.

At a process 310, a live reality feed is received. In some examples, the live reality feed, such as live reality feed 140, may be received by a blending engine, such as blending engine 110, from one or more video cameras. In some examples, the one or more video cameras may be mounted on a head-mounted display, such as head-mounted display 120. In some examples, the live reality feed may correspond to a live view as would be seen by a user were the user not using the head-mounted display. In some examples, the live reality feed may include an extended view of the physical world about the user as would be captured by multiple video cameras pointed in different directions. In some examples, the live reality feed may be monoscopic and/or stereoscopic. In some examples, the live reality feed from each of the video cameras may be processed using corresponding video camera transforms based on an orientation of each of the corresponding video cameras in the physical world. In some examples, the video camera transforms may include one or more projections.

At a process 320, a virtual reality feed is received. In some examples, the virtual reality feed, such as virtual reality feed 130, may be received by the blending engine. In some examples, the virtual reality feed may be provided by a virtual reality system, a game, entertainment software, and/or the like.

At a process 330, user movement is tracked. In some examples, the blending engine uses one or more sensors, such as the one or more sensors 150, to track user movement. In some examples, the one or more sensors include one or more accelerometers, gyroscopes, cameras, and/or the like to track movement of the user's head, arms, hand, legs, feet, and/or the like. In some examples, the one or more sensors may further track movement of a head-mounted display. In some examples, the one or more sensors continuously track the movement of the user's body. In some examples, the tracked movement may include one or more of an amount of upward or downward tilt of the user's head, an amount of forward or rearward lean of the user's body, relative motion of the user's hands as the user manipulates one or more physical objects and/or one or more controllers. In some examples, the one or more controllers may include user interface devices such as a mouse, a keyboard, a joy stick, a track ball, a touch sensitive surface, a remote control, a virtual reality controller, and/or the like. In some embodiments, tracking of the user movement may further including recording motion of the user's body.

At a process 340, a command is detected based on the tracked movement. As the blending engine tracks the user movement during process 330, the blending engine evaluates the tracked movement to determine whether it corresponds to one or more commands for the blending engine, a virtual reality system, a game or other software running on the computer hosting the blending engine, and/or the like. In some examples, the one or more commands may include commands to turn on blending of the live reality feed into the virtual reality feed, turn off blending of the live reality feed into the virtual reality feed, adjust an amount of blending between the live reality feed and the virtual reality feed, change a scaling between the tracked movement and motion in a virtual reality environment of the virtual reality feed, and/or the like. In some examples, a downward head tilt of the user, such as to examine a physical object, manipulate a user interface device, look at a computer monitor, and/or the like, may be interpreted as a command to turn on blending of the live reality feed into the virtual reality feed. In some examples, an upward head tilt of the user may be interpreted as a command to turn off blending of the live reality feed into the virtual reality feed. In some examples, a change in an amount of head tilt upward or downward may be interpreted as a command to correspondingly adjust an amount of blending of the live reality feed into the virtual reality feed so that as the user looks upward and/or downward the amount of blending changes with the increased and/or decreased tilt. In some examples, a turn of the user to look backward (e.g., to respond to another person in the physical world) may be interpreted as a command to turn on blending of the live reality feed into the virtual reality feed. In some examples, manipulation of a physical object and/or user interface device, such as using a mouse, typing on a keyboard, and/or the like, may be interpreted as a command to turn on blending of the live reality feed into the virtual reality feed. In some examples, a forward lean of the user may be interpreted as a command to amplify or scale the amount of relative motion between the physical world and the virtual reality environment so that more apparent space exists in the virtual reality environment than exists in the physical world.

At a process 350, the live reality feed and the virtual reality feed are blended based on the command. Using the command detected during process 340, the blending engine makes one or more adjustments to how the live reality feed and the virtual reality feed are blended together to create a blended view or blended user interface including elements from both the live reality feed and the virtual reality feed. In some examples, the blended view may include elements from the virtual reality feed without elements from the live reality feed, elements from both the virtual reality feed and the live reality feed, or elements from the live reality feed without elements from the virtual reality feed. In some examples, the blending engine may use a blending technique, such as alpha blending, to generate the blended view. In some examples, the blending engine may adjust a blending factor, such as an alpha blending factor, that determines how prominently elements from the live reality feed are displayed within the blended view. In some examples, the blending factor may correspond to a transparency level of the live reality feed where zero corresponds to completely transparent and one corresponds to completely opaque. In some examples, the blending engine may mix the live reality feed in a semi-transparent form over the virtual reality feed so that both the live reality feed and the virtual reality feed are visible in the blended view. In some examples, the live reality view may be blended into the virtual reality view so that the live reality view appears to the user with an orientation that is consistent with how the user would be viewing the live reality feed directly without the incorporation of the virtual reality feed. In some examples, the orientation of the live reality feed may be determined based on orientations of the one or more video cameras used to capture the live reality feed relative to an orientation of the user. In some examples, the live reality feed may be adjusted to appear as a live view that would be observed by the user in the physical world were the user not wearing the head-mounted display. In some examples, the adjustment may account for differences in position and/or orientation of the one or more video cameras and the view point of the user.

In some examples, the orientation and/or view point of the user may be determined using one or more sensors, such as the one or more sensors used to track user movement during process 330. In some examples, the blending engine may blend the live reality feed and the virtual reality feed together using depth-based occlusion where one or more elements from the live reality feed and/or the virtual reality feed are selectively displayed and/or discarded based on distance (i.e., depth) from the user. In some examples, only the user's hands and/or other nearby physical objects are blended into the blended view. In some examples, the live reality feed is blended into the virtual reality feed as a projection onto a virtual surface, such as a rectangular video area. In some examples, the live reality feed is stenciled into the blended view using a stencil. In some examples, the blending of process 350 may be adjusted according to heuristics based on previous user interactions with the blending engine.

Figure 4A:
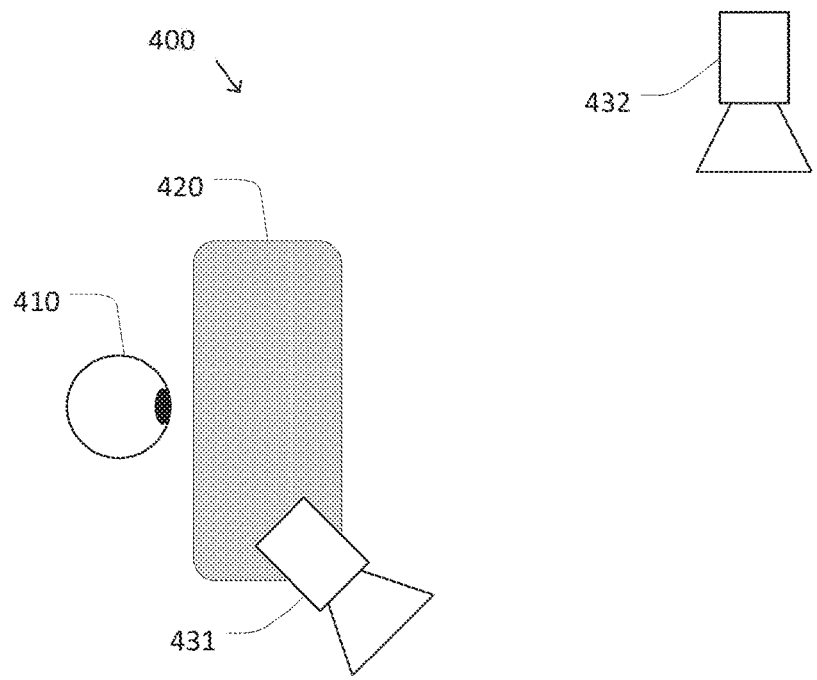
FIGS. 4A and 4B show representative examples of live reality feeds being blended into a blended view according to some embodiments.
Figure 4B:
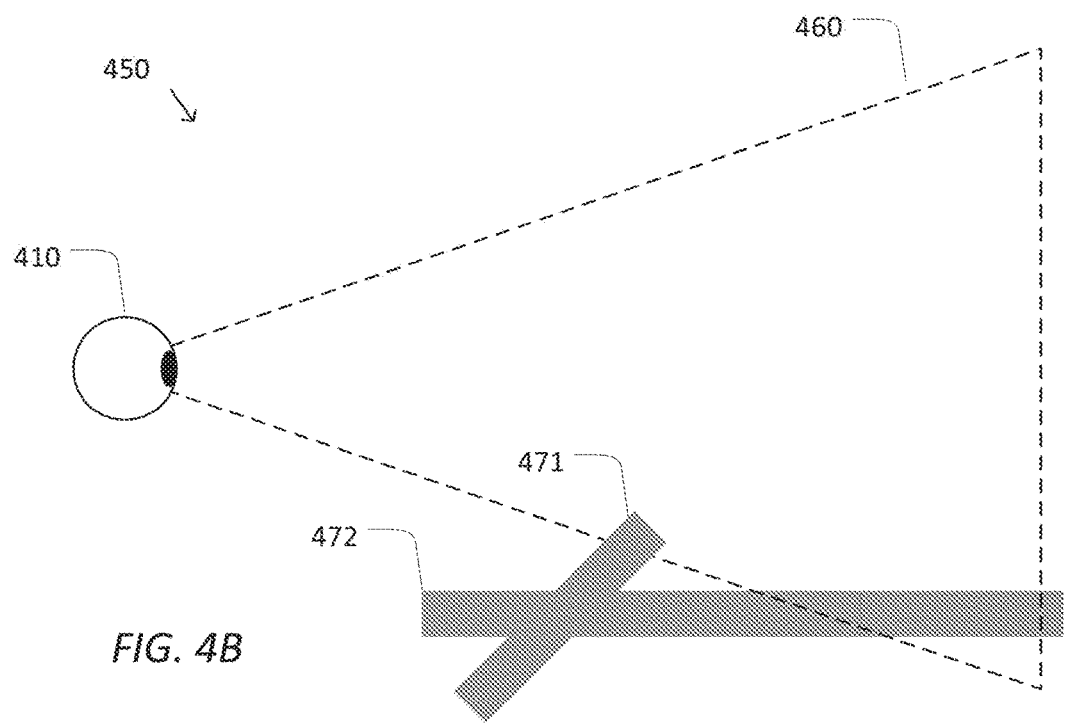

FIGS. 4A and 4B show representative examples of live reality feeds being blended into a blended environment 450 according to some embodiments. As shown in FIG. 4A, a live environment 400, such as may be consistent with live environment 210, includes a user (depicted as eye 410) and a head-mounted display 420. In some examples, head-mounted display 420 is consistent with head-mounted display 120. Also included in live environment 400 are a first camera 431 mounted to head-mounted display 420 and a second camera 432 positioned as an overhead camera. In some examples, first camera 431 may move with the user and/or second camera 432 may be fixed in live environment 400. A blending engine, such as blending engine 110, keeps track of the location and orientation of first camera 431 by maintaining a first camera coordinate frame that tracks first camera 431 with respect to a world coordinate system. As the user moves about and/or the user turns or tilts his or her head, the blending engine updates the first camera coordinate frame. The blending engine further maintains a first camera projection distance for first camera 431 that is used to position the two-dimensional images obtained by first camera 431 at a distance in front of the location of first camera 431 so as to more accurately render them within blended environment 450 as is discussed in further detail below. In some examples, the first camera projection distance may be set to the virtual equivalent of one meter to mimic the approximate locations of the user's hands relative to the user's head. Similarly, the blending engine maintains a second camera coordinate frame and a second camera projection distance for second camera 432. In some examples, the first and second camera coordinate frames and camera projection distances may be configurable by the user so that the corresponding live camera feeds included in blended environment 450 may appear more natural to the user. For example, a user with a smaller body size may prefer a first camera projection distance shorter than preferred by another user. In some examples, when first camera 431 and/or second camera 432 is a stereoscopic camera, the first and/or second camera projection distance may be omitted. And, although FIG. 4A depicts only first camera 431 and second cameras 432, it is understood that other and/or additional cameras with different locations and orientations are possible within live environment 400.

When the live camera feeds from first camera 431 and/or second camera 432 are to be blended into blended environment 450, such as for inclusion in a blended user interface like blended user interface 220, the live camera feeds are projected using the respective first and second camera coordinate frames and the first and second camera projection distances as shown in FIG. 4B. More specifically, FIG. 4B shows the user's eye 410 relative to a viewing frustum 460 as would be depicted on head-mounted display 420. As shown, the live camera feed from first camera 431 is projected the first camera projection distance relative to the origin of the first camera coordinate frame (i.e., the location of first camera 431 in the first camera coordinate frame) along a direction of view of first camera 431. During this projection, the live camera feed from first camera 431 may additionally be scaled based on the first camera projection distance so that the size of the live camera feed may approximate the actual size of the objects and/or elements included in the live camera feed as they would appear as if directly viewed by the user in live environment 400. In some examples, the projected live camera feed may be projected as a texture on a virtual surface. The projected live camera feed is then mapped using an inverse transform based on the first camera coordinate frame to place the projected live camera feed at the appropriate location and orientation within blended environment 450. This is shown by the representative virtual surface 471 in FIG. 4B. The live camera feed from second camera 432 is similarly projected and transformed based on the second camera coordinate frame and the second camera projection distance to create representative virtual surface 472. Virtual surfaces 471 and/or 472 are then processed by the current viewing transform of the user to generate corresponding content within viewing frustum 460. Although not expressly shown in FIG. 4B, depth occlusion and/or other techniques may also be applied so that portions of virtual surface 471 and/or 472 may occlude from view some and/or all of virtual surfaces 472 and/or 471 and/or other virtual objects. In some examples, when first camera 431 and/or second camera 432 provide stereoscopic live camera feeds, these stereoscopic live camera feeds may alternatively be projected as voxels within the respective camera coordinate frame based on the distance data included in the respective stereoscopic live camera feed.

Referring back to FIG. 3, according to some embodiments, the blending performed by the blending engine depends on the command detected during process 340. In some examples, when the command is a command to turn off blending (e.g., because the user looked up), the blending factor may be set so that the live reality feed is fully transparent and is not visible in the blended view. In some examples, when the command is a command to turn on blending (e.g., because the user looked down, manipulation of a physical object and/or controller by the user, and/or the like), the blending factor may be set so that the live reality feed is partially transparent and is at least partially viewable in the blended view. In some examples, when the command is a command to adjust the level of blending (e.g., because of change in a head tilt of the user), the blending factor may be set so that the level of transparency of the live reality feed may be adjusted upward and/or downward to give the live reality feed more and/or less prominence within the blended view. In some examples, when the command is a command to alter a level of scale between the physical world and the virtual reality environment (e.g., because the user changed a level of body tilt), a transform used to map the live reality feed to the virtual reality feed, such as a projection transform, is adjusted to change the relative scaling between the physical world and the virtual reality environment.

At a process 360, the blended view determined during process 350 is displayed to the user. In some examples, the blended view is displayed to the user using a head-mounted display, such as head-mounted display 120. In some examples, the blended view may be displayed monoscopically and/or stereoscopically.

Processes 310-360 of method 300 are then repeated to provide a continuous blended view to the user that varies as the user moves about, manipulates the virtual reality environment of the virtual reality feed, interacts with the physical environment, and/or the like. In some examples, processes 310-360 of method 300 are repeated at an appropriate rate so that changes in the amount of blending between the live reality feed and the virtual reality feed appear smooth and/or without significant discontinuities. In some embodiments, the repetition of method 300 may result in a blended view where the live reality feed fades in and/or out relative to the virtual reality feed as the user moves about and/or interacts with the physical world and/or the virtual reality environment. In some examples, as the user looks up or down the live reality feed may be faded in and/or out based on a level of head tilt so that as the user continues to look more downward, the live reality feed slowly becomes more prominent and/or as the user continues to look more upward, the prominence of the live reality feed decreases. In some commands, commands to turn on and/or turn off the blending may be implemented over time (e.g., by incremental adjustments of the blending factor) to provide a smooth transition between blending in of the live reality feed and/or removal of the live reality feed from the blended view. In some examples, as the user reduces and/or ceases manipulation of a physical object, a user interface device, and/or the like, the prominence of the live reality feed within the virtual view may slowly be reduced.

As discussed above and further emphasized here, FIG. 3 is merely an example which should not unduly limit the scope of the claims. One of ordinary skill in the art would recognize many variations, alternatives, and modifications. In some embodiments, the commands detected during process 340 may be used for purposes other than adjustment to the blending of the live reality feed and the virtual reality feed. In some examples, the commands may include a command to interact with virtual objects, such as to open virtual doors, manipulate (e.g., move, scale, rotate, etc.) virtual objects, and/or the like. In some examples, the commands may include a gameplay command. In some example, the commands may include a command to display one or more gestures to another user and/or avatar in the virtual reality environment. In some examples, the commands may include a command to adjust system properties, such as a sound volume and/or the like.

Some examples of the blended reality user interface and gesture control system described herein may include non-transient, tangible, machine readable media that include executable code that when run by one or more processors (e.g., one or more microprocessors, multi-core processors, graphics processing units, field-programmable gate arrays, application-specific integrated circuits, servers, and/or the like, may cause the one or more processors to perform the processes of method 300 and/or as otherwise described herein. Some common forms of machine readable media that may include the processes and methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
a blended engine communicatively coupled to a display, the blended engine configured to:
receive a first live reality feed captured using a first camera;
receive a second live reality feed captured using a second camera,
wherein the second camera is fixed in a real-world environment;
receive a virtual reality feed;
receive a movement of a user captured using a sensor;
detect a command from the captured movement of the user;
incrementally adjust a level of prominence among the first live reality feed, the second live reality feed, and the virtual reality feed to form a blended view based on the detected command by adjusting visibility of the first live reality feed, the second live reality feed or the virtual reality feed within the blended view; and
causing the display to display the blended view.

2. The system of claim 1, wherein the display is a head-mounted display and wherein the first camera is mounted on the head-mounted display.

3. The system of claim 1, wherein the blended engine is further configured to:
project the first live reality feed and the second live reality feed into a viewing frustrum with respect to the user; and
wherein the blended view includes the projected first live reality feed and the projected second live reality feed.

4. The system of claim 1, wherein the detected command turns the blending off and wherein the blended engine is configured to incrementally adjust the level of prominence until the first live reality feed and the second live reality feed are transparent in the blended view.

5. The system of claim 4, wherein the captured movement of the user associated with the command is the user looking up.

6. The system of claim 1, wherein the detected command is to turn the blending on and wherein the blended engine is configured to incrementally adjust the level of prominence until the first live reality feed and the second live reality feed are partially viewable in the blended view.

7. The system of claim 6, wherein the captured movement of the user associated with the command is the user looking down.

8. The system of claim 1, wherein the detected command is to adjust the level of prominence and wherein the blended engine is configured to incrementally adjust the level of prominence of the first live reality feed or the second live reality feed in the blended view upward or downward.

9. The system of claim 8 wherein the command is a change in a head tilt of the user.

10. The system of claim 1, wherein the blending engine is further configured to:
  detect a second command to alter a scale between a physical word associated with the first live reality feed and the second live reality feed and a virtual word associated with the virtual reality feed;
  adjusted a transform function that maps the first live reality feed or the second live reality feed into the virtual reality feed to change the scale between a physical world and a virtual reality world; and
  map the first live reality feed or the second live reality feed into the virtual reality feed based on the adjusted transform function.

11. The system of claim 1, wherein the virtual reality feed is received from a game software.

12. The system of claim 1, wherein the virtual reality feed is associated with an entertainment software.

13. The system of claim 1, wherein the blended view is projected on a second display from a perspective of a head-mounted display.

14. The system of claim 1, wherein the sensor continuously records the movement of the user and transmits the movement of the user to the blended engine.

15. A method comprising:
  receiving, at a blended engine, a first live reality feed captured using a first camera, a second live reality feed captured using a second camera in a real-world environment, and a virtual reality feed;
  receiving, a movement of a user captured using a sensor;
  detecting a command from the captured movement of the user; and
  incrementally adjusting, at the blended engine, a level of prominence among the first live reality feed, the second live reality feed, or the virtual reality feed to form a blended view based on the detected command by adjusting visibility of the first live reality feed, the second live reality feed or the virtual reality feed within the blended view; and
  displaying the blended view.

16. The method of claim 15, wherein a display that displays the blended view is a head-mounted display and the first camera is mounted on the head-mounted display.

17. The method of claim 15, wherein the blended engine is further configured to:
  projecting, at the blended engine, the first live reality feed and the second live reality feed into a viewing frustrum with respect to the user; and
  wherein the blended view includes the projected first live reality feed and the projected second live reality feed.

18. The method of claim 15, wherein the detected command is to turn off the blending based on the captured movement of looking down, to turn on the blending based on the captured movement of looking up, or to adjust the level of prominence based on the captured movement of a change in head tilt.

19. A non-transitory computer readable medium having instructions thereon, that when executed by a computing device, cause the computing device to perform operations comprising:
  receiving, at a blended engine, a first live reality feed captured using a first camera, a second live reality feed captured using a second camera in a real-world environment, and a virtual reality feed from a gaming software;
  receiving, a movement of a user, the movement captured using a sensor;
  detecting a command from the captured movement of the user; and
  incrementally adjusting, at the blended engine, a level of prominence among the first live reality feed, the second live reality feed, or the virtual reality feed to form a blended view based on the detected command by adjusting visibility of the first live reality feed, the second live reality feed or the virtual reality feed within the blended view; and
  displaying the blended view on a display.

20. The non-transitory computer readable medium of claim 19, wherein the detected command is to turn the blending on or off; and
  wherein the instructions when executed by the computing device, cause the computing device to perform operations comprising incrementally adjusting the level of prominence until the first live reality feed and the second live reality feed are partially viewable in the blended view; or
  wherein the instructions when executed by a computing device, cause the computing device to perform operations comprising incrementally adjusting the level of prominence until the first live reality feed and the second live reality feed are transparent in the blended view.

* * * * *